No. 851,122. PATENTED APR. 23, 1907.
A'QUILLA DUENSING.
CONVEYER CHAIN FOR POTATO PLANTERS.
APPLICATION FILED JUNE 16, 1906.

Witnesses.
K. K. Keffer
J. B. Smutney

Inventor.
A'Quilla Duensing.
by Orwig & Lane Attys.

UNITED STATES PATENT OFFICE.

A'QUILLA DUENSING, OF ALTOONA, IOWA, ASSIGNOR OF ONE-HALF TO C. C. LANG, OF ALTOONA, IOWA.

CONVEYER-CHAIN FOR POTATO-PLANTERS.

No. 851,122.   Specification of Letters Patent.   Patented April 23, 1907.

Application filed June 16, 1906. Serial No. 322,324.

*To all whom it may concern:*

Be it known that I, A'QUILLA DUENSING, a citizen of the United States, residing at Altoona, in the county of Polk and State of Iowa, have invented a certain new and useful Conveyer-Chain for Potato-Planters, of which the following is a specification.

The object of my invention is to provide a conveyor chain of simple, durable and inexpensive construction designed during its upward movement to engage a single potato or other soft article and to carry it upwardly to an elevated point of discharge and to automatically remove the potato and force it away from the conveyor chain.

My invention consists in the construction, arrangement and combination with a sprocket chain of the potato engaging points and the automatic potato removing arm, whereby the objects contemplated are attained, as hereinafter more fully set forth, pointed out in my claims and illustrated in the accompanying drawings, in which—

Figure 1:
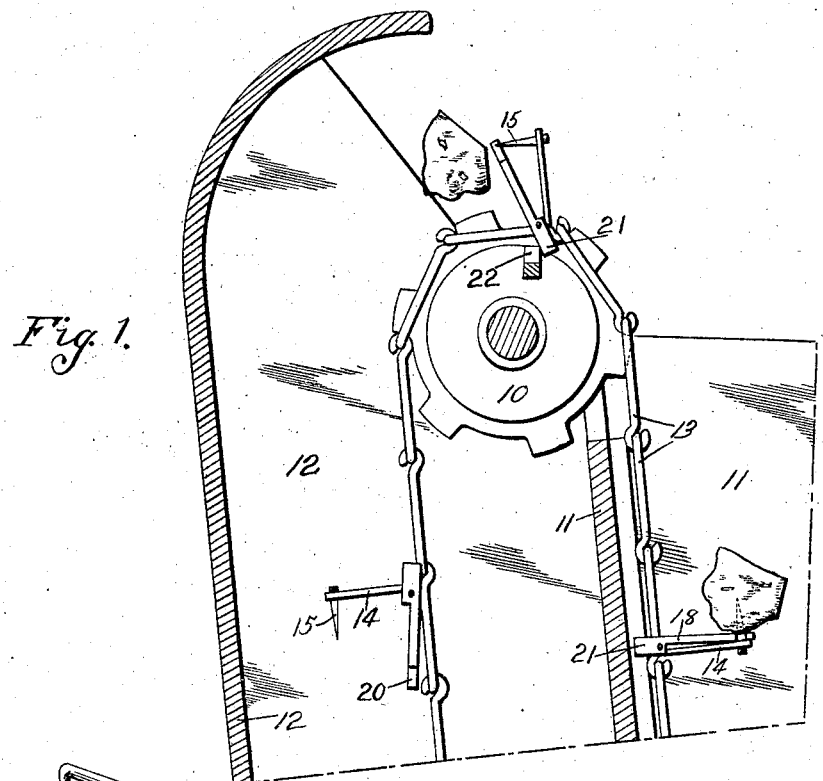
Figure 2:
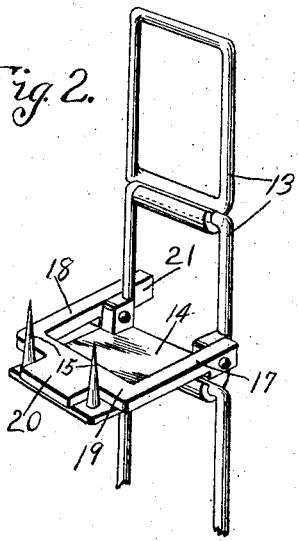
Figure 3:
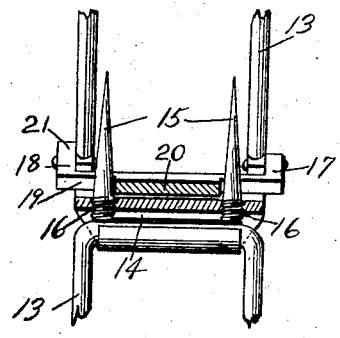

Figure 1 shows a side elevation of a sprocket wheel, a portion of the conveyor chain traveling over the sprocket wheel and a number of potato engaging arms thereon and a section of a hopper of a discharge chute and also the means for actuating the device for removing potatoes from the conveyor. Fig. 2 shows a detail, perspective view of a portion of a conveyor chain embodying my invention, and Fig. 3 shows a detail view, partly in section, illustrating the means for detachably connecting the sharpened tines with the conveyor plates.

Referring to the accompanying drawings, I have used the reference numeral 10 to indicate a sprocket wheel, 11 to indicate a portion of a hopper and 12 to indicate a portion of a discharge chute.

The conveyor is composed of a sprocket chain 13 of ordinary construction. Connected with some links of said sprocket chain are the plates 14 fixed to said links and extended at right angles thereto. Near the outer end of each plate are two screw threaded openings and in each opening is secured a pointed tine 15 having a screw threaded end 16. These tines stand at right angles to plates 14.

Pivoted to the link of the chain adjacent to each plate 14 is a tine scraper comprising parallel arms 17 and 18 and a cross piece 19 having an extension 20. This extension is so arranged that, when the arms 17 and 18 swing on their pivots, any article on the tines will be scraped from them. The arm 18 is provided with an extension 21 projecting beyond the link to which it is pivoted, in a direction away from the plate 14. Mounted adjacent to the top portion of the sprocket wheel 10 is a stationary arm 22 in the path of the extensions 21 of the arms 18.

In practical use and assuming the parts to be arranged, as shown in Fig. 1, the chain and its attachments is made to move by the sprocket wheel 10 in a direction causing it to move upwardly through the hopper 11. When in this position, the scraper will stand above the plate 14, thus leaving the tines free to be inserted in a potato, or other article in the hopper. Obviously only one potato at a time can be engaged because when the tines have engaged a single potato, the potato itself will prevent the tines from entering other potatoes. The tines will then carry the potato upwardly until the stationary arm 22 is reached, then the extension 21 will strike said arm and cause the scraper to move away from the blade, thus positively forcing the potato from the tines. This will also tend to throw the potato forwardly and away from the sprocket wheel and into the chute. Then as the plate 14 moves downwardly in the chute 12, it will hang by gravity to the position shown to the left in Fig. 1, but when rounding the turn, the scraper will again assume the position by the action of gravity resting on top of the plate 14. By having the tines made detachable they may be easily and quickly removed to be sharpened or if one is broken, another may be quickly and easily substituted.

Having thus described my invention, what I claim and desire to secure by Letters Patent of the United States, therefor is—

In a device of the class described, the combination of a sprocket chain, a plate fixed thereto and extended at right angles, two tines connected with the plate, a scraper pivoted to the chain in advance of the plate, the outer end of the scraper normally resting on top of the plate as the chain is moving upwardly and extended between said tines, an extension on the scraper projecting beyond the chain in a direction opposite from the plate and a stationary arm arranged in the path of travel of said extension.

A'QUILLA DUENSING.

Witnesses:
C. C. LANG,
D. C. BISHARD.